United States Patent [19]

Fabianowski et al.

[11] Patent Number: 4,942,494
[45] Date of Patent: Jul. 17, 1990

[54] SHORT-CIRCUIT PROTECTOR FOR A HALF-CONTROLLED THREE-PHASE BRIDGE

[76] Inventors: Jan Fabianowski, Küsterkamp 3, D-4600 Dortmund; Robert Ibach, Kleeweg 9, D-5840 Schwerte; Georg Gierse, Am Herrenbusch 6, D-5810 Witten, all of Fed. Rep. of Germany

[21] Appl. No.: 418,397

[22] Filed: Oct. 6, 1989

[30] Foreign Application Priority Data

Oct. 10, 1988 [DE] Fed. Rep. of Germany ....... 3834412

[51] Int. Cl.$^5$ ............................................. H02H 3/08
[52] U.S. Cl. ........................................ 361/93; 363/50
[58] Field of Search ...................... 361/87, 97; 363/49, 363/50, 51, 52

[56] References Cited

U.S. PATENT DOCUMENTS 3,887,862  6/1975  Huber ..................................... 363/50
4,428,023  1/1984  Maier ............................... 363/50 X Primary Examiner—Derek S. Jennings
Attorney, Agent, or Firm—Herbert L. Lerner; Laurence A. Greenberg

[57] ABSTRACT

In a half-controlled three-phase bridge for feeding an inductive load, a further, externally charged capacitor and a further thyristor are additionally connected to the conventional protective capacitor which is already in existence. The further capacitor, which is charged from an external high-impedance voltage source, has the effect of causing an increased load current to be taken over by the further thyristor so that one of the conducting thyristors of the bridge is extinguished. The capacitor recharges and its voltage is used as a blocking voltage for the thyristor of the bridge which has just been extinguished so that the energy supply from the power system is stopped. The current in the load circuit can then be removed through a free-wheeling diode.

2 Claims, 1 Drawing Sheet

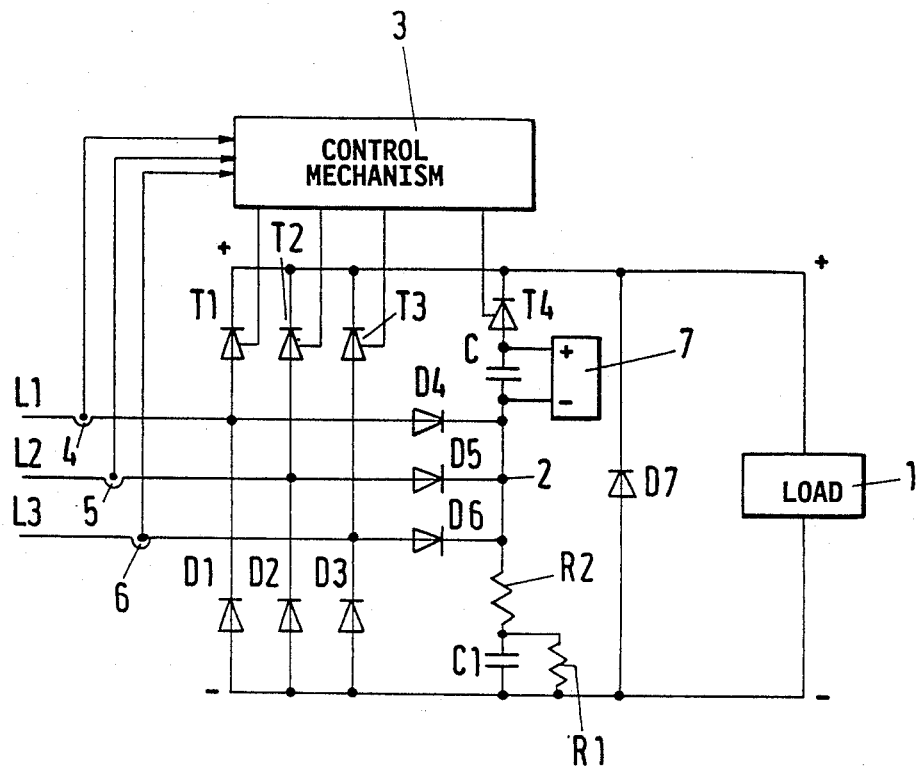

SHORT-CIRCUIT PROTECTOR FOR A HALF-CONTROLLED THREE-PHASE BRIDGE

The invention relates to a short-circuit protector for a three-phase bridge, including a half-controlled three-phase bridge, a free-wheeling diode in the load circuit connected in parallel therewith, a control mechanism for driving the thyristors which are disposed in a cathode group, and a plurality of additional diodes supplementing the half-controlled three-phase bridge to from a complete rectifier bridge, a common output of the rectifier bridge being connected through a series-circuit of a resistor and a capacitor with a parallel discharge resistor to a common negative potential.

When a load is supplied with a high short-circuit power, the short-circuit current can rise very rapidly. Half-controlled bridges with a three-phase construction are used, for example, in order to supply such loads. When a short-circuit occurs, it is not sufficient to block the firing pulses of the thyristors since the inductance in the load circuit which is only very low cannot limit the current occurring below the permissible limit-load integral of the thyristors and would destroy them. There are load configurations, such as in inductive heating, which occasionally cause a short-circuit during operation. In known devices of that type, a protection against short-circuit current was heretofore ensured by superfast semiconductor fuses or by a high-speed circuit breaker. The disadvantage of such devices is that the fuses are destroyed and the high-speed circuit breakers experience mechanical wear. An additional thyristor provided with a quenching device has also been used in series with the load. A disadvantage of that device is that, in addition to increased expenditure, the entire load current is conducted through a further loss-producing component.

It is accordingly an object of the invention to provide a short-circuit protector for a half-controlled three-phase bridge, which overcomes the hereinafore-mentioned disadvantages of the heretofore-known devices of this general type and which reliably and simply disconnects a half-controlled three-phase bridge for feeding an inductive load in case of a short-circuit.

With the foregoing and other objects in view there is provided, in accordance with the invention, a short-circuit protector for a three-phase bridge, comprising a half-controlled three-phase bridge having bridge thyristrers in a cathode group, diodes, and a common output, a free-wheeling diode in a load circuit, the free-wheeling diode being connected in parallel with the half-controlled three-phase bridge, a control mechanism for driving the bridge thyristors, and a plurality of additional diodes having cathodes and supplementing the half-controlled three-phase bridge to form a complete rectifier bridge, a series-circuit of a resistor and a capacitor with a parallel discharge resistor being connected between the common output and a common negative potential, a further capacitor connected to the cathodes of the additional diodes, an external direct-voltage source for charging the further capacitor, and a further thyristor to be driven by the control mechanism, the further thyristor being connected in series with the further capacitor and having a cathode connected to the cathodes of the bridge thyristors.

In accordance with a concomitant feature of the invention, the control mechanism includes means for firing the further thyristor upon the occurrence of a short-circuit in the load circuit with simultaneous blocking of pulses for the bridge thyristors, taking over of a short-circuit current from one of the conducting bridge thyristors, ensuring that a blocking voltage is present for a sufficiently long period at a bridge thyristor which has just been extinguished and subsequent absorption of current by the free-wheeling diode after recharging of the further capacitor, whereby current increases towards zero due to lack of energy resupply from a power system The advantageous factor in the short-circuit protector according to the invention is, in particular, the cost-saving and simple manner of short-circuit disconnection. It was only by expanding an already existing supply circuit for inductive loads by one capacitor with an external directvoltage source and a thyristor, that reliable disconnection of a short-circuit which had occurred could be achieved. This makes it possible to omit delicate and susceptible electronic fuses and high-speed circuit breakers which are subject to mechanical wear. The entire configuration is again ready for operation immediately after the disconnection of a short-circuit which has occurred.

Other features which are considered as characteristic for the invention are set forth in the appended claims.

Although the invention is illustrated and described herein as embodied in a short-circuit protector for a half-controlled three-phase bridge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with accompanying drawing.

The drawing is schematic and block circuit diagram of an illustrative embodiment of the invention.

Referring now to the single figure of the drawing in detail, there is seen a load 1 with a high short-circuit power which is supplied from a three-phase power system L1, L2, L3 through a rectifier bridge. A respective thyristor T1, T2, T3 leads in the forward direction from each phase L1, L2, L3 of the three-phase power system or current supply network to a common positive potential. The thyristors T1-T3 are connected in a cathode group, since the cathodes thereof are interconnected. Furthermore, a respective diode D4, D5, D6 leads in the forward direction from each phase Ll, L2, L3 to a common bus bar 2. A connection is additionally provided from each respective phase Ll, L2, L3 through a respective diode D1, D2, D3 which is operated in the reverse direction, to a common negative potential. The thyristors T1, T2, T3 are driven by a common control mechanism 3. The control mechanism 3 is influenced by commerciall), available current sensing devices 4, 5, 6 from the phases Ll, L2 and L3 of the three-phase power system. A series circcuit of a resistor R2 and a capacitor C1, which is bypassed by a further resistor Rl, leads from the common bus bar 2 to the negative potential. This half-controlled rectifier bridge is bypassed in a conventional manner by means of a free-wheeling diode D7 connected in parallel with the load 1.

Such a circuit reliably disconnects the rectifier bridge and also protects the rectifier components against overvoltage from the power system and from the commutation, in case of a short-circuit.

In this configuration, the energy of the over voltage which occurs is absorbed by the capacitor C1. The capacitor C1 is charged to the peak voltage of the power system when the three-phase system L1, L2, L3 is connected. When voltage peaks from the system or commutation overvoltages occur, charging current flows into the capacitor. The energy of the voltage peaks increases the charge of the capacitor C1. The charge is subsequently removed again through the parallel resistor R1. The invention is based on this overvoltage protection, which is already known.

Further details of the protective circuit according to the invention will be described in the text which follows.

The half-controlled three-phase bridge includes the three thyristors T1, T2, T3 and the three diodes D1, D2, D3. Since there are already three diodes, the missing half of the overvoltage protection can be developed by the three further diodes D4, D5, D6. The capacitor C1 is connected in series with the resistor R2 which is small in size, at the output of the diodes D1, D2, D3, D4, D5, D6. The resistor R1 is connected in parallel with the capacitor C1 for discharging. When the voltage of the three-phase power system L1, L2, L3 is connected, the capacitor C1 is charged up to the peak value of the system voltage. The time constant of the components R1/C1 is selected to be considerably greater than the duration of the power system period. The potential at one side of the capacitor C1 is connected to the zero potential of the load 1 and to the negative output of the rectifiers or diodes D1, D2, D3. The invention is based on the potential of the charged capacitor C1. The potential of the capacitor at the bus bar 2 or at the junction of the diodes D4, D5, D6 is the maximum potential which occurs across the thyristors T1, T2, T3.

In accordance with the invention, an additional externally charged capacitor C is provided and the potential across the capacitor C is increased due to the fact that the negative pole of the capacitor C is connected to the common bus bar 2 and the capacitor C is charged up from a high-resistance external direct-voltage source 7. The positive pole of the capacitor C is connected through a further thyristor T4 to the positive potential or to the other end of the load 1 and to the thyristors T1, T2, T3. The thyristor T4 is also driven by the control mechanism 3.

When a short-circuit occurs in the load circuit 1, the short-circuit is detected by the control unit 3 through the current sensing devices 4, 5, 6. When an overcurrent is detected, the control unit 3 fires the thyristor T4 and thus switches the higher potential of the externally charged capacitor C to the load circuit. The firing pulses of the thyristors T1, T2, T3 are blocked simultneously with the ignition of the thyristor T4 by the control mechanism 3. As a result, the current commutates from one of the conducting thyristors T1, T2 or T3 to the thyristor T4, that is to say the thyristor T4 takes over the increased load current which is currently flowing. The thyristor T1, T2 or T3 that is currently switched on is extinguished after the current commutates to thyristor T4. After the commutation, the voltage of the capacitor C is present at the thyristor T1, T2 or T3 which has just been extinguished as a blocking voltage through the conducting thyristor T4. Since the increased load current is then flowing through the thyristor T4 and the capacitor C, the capacitor C is recharged as compared with the high-impedance external voltage source 7. The capacitance of the capacitor C and the magnitude of the charging voltage are selected in such a manner that the blocking voltage is present at the thyristor T1, T2 or T3 which has just been extinguished, for a longer period than its circuit-commutated recovery time. Due to the recharging of the capacitor C, the previously positive voltage across the load 1 drops until this voltage becomes negative. The current then commutates from the thyristor T4 to the diode D7. Since the thyristor 4 is then also extinguished and the thyristors T1, T2, T3 are also extinguished, the energy supply from the power system is stopped. The current in the load circuit 1 is reduced in the direction toward zero through the diode D7. The short-circuit which has occurred is thus disconnected. After the thyristor T4 has been extinguished, the capacitor C is charged up again from the voltage source 7 and the half-controlled rectifier bridge is again ready to be switched on.

The foregoing is a description corresponding in substance to German Application P 38 34 412.2, dated Oct. 10, 1988, the International priority of which is being claimed for the instant application, and which is hereby made part of this application. Any material discrepancies between the foregoing specification and the aforementioned corresponding German application are to be resolved in favor of the latter.

We claim:

1. Short-circuit protector for a three-phase bridge, comprising a half-controlled three-phase bridge having bridge thyristors in a cathode group, diodes, and a common output, a free-wheeling diode in a load circuit, said free-wheeling diode being connected in parallel with said half-controlled three-phase bridge, a control mechanism for driving said bridge thyristors, and a plurality of additional diodes having cathodes and supplementing said half-controlled three-phase bridge to form a complete rectifier bridge, a series-circuit of a resistor and a capacitor with a parallel discharge resistor being connected between said common output and a common negative potential, a further capacitor connected to the cathodes of said additional diodes, an external direct-voltage source for charging said further capacitor, and a further thyristor to be driven by said control mechanism, said further thyristor being connected in series with said further capacitor and having a cathode connected to the cathodes of said bridge thyristors.

2. Short-circuit protector according to claim 1, wherein said control mechanism includes means for firing said further thyristor upon the occurrence of a short-circuit in the load circuit with simultaneous blocking of pulses for said bridge thyristors, taking over of a short-circuit current from one of said conducting bridge thyristors, ensuring that a blocking voltage is present for a sufficiently long period at a bridge thyristor which has just been extinguished and subsequent absorption of current by said free-wheeling diode after recharging of said further capacitor, whereby current increases towards zero due to lack of energy resupply from a power system.

* * * * *